United States Patent
Motomatsu et al.

(10) Patent No.: US 7,880,846 B2
(45) Date of Patent: Feb. 1, 2011

(54) LIQUID CRYSTAL DISPLAY DEVICE AND METHOD OF FABRICATING THE SAME

(75) Inventors: Toshihiko Motomatsu, Kanagawa (JP); Mitsuhiro Sugimoto, Kanagawa (JP)

(73) Assignee: NEC LCD Technologies, Ltd., Kawasaki, Kanagawa (JP)

( * ) Notice: Subject to any disclaimer, the term of this patent is extended or adjusted under 35 U.S.C. 154(b) by 238 days.

(21) Appl. No.: 12/081,103

(22) Filed: Apr. 10, 2008

(65) Prior Publication Data

US 2008/0252835 A1    Oct. 16, 2008

(30) Foreign Application Priority Data

Apr. 13, 2007 (JP) ............................. 2007-105717
Feb. 29, 2008 (JP) ............................. 2008-049315

(51) Int. Cl.
G02F 1/1337 (2006.01)

(52) U.S. Cl. ..................... 349/129; 349/123; 349/187

(58) Field of Classification Search ................ None
See application file for complete search history.

(56) References Cited

U.S. PATENT DOCUMENTS

2010/0085519 A1* 4/2010 Liao ........................... 349/110

FOREIGN PATENT DOCUMENTS

| JP | 5-333338 | | 12/1993 |
|---|---|---|---|
| JP | 10-260406 | | 9/1998 |
| JP | 10260406 A | * | 9/1998 |
| JP | 2002-258287 | | 9/2002 |
| JP | 2003-20356 | | 1/2003 |
| JP | 2003-222887 | | 8/2003 |
| JP | 2003-233075 | | 8/2003 |
| JP | 2006-78930 | | 3/2006 |
| JP | 2006078930 A | * | 3/2006 |

* cited by examiner

Primary Examiner—Michelle R Connelly Cushwa
(74) Attorney, Agent, or Firm—McGinn IP Law Group, PLLC

(57) ABSTRACT

In applying an alignment material to surfaces of a CF substrate and a TFT substrate, which form a liquid crystal panel, to form alignment films, an alignment film is formed so as to cover at least a display region in which pixels are arranged in a matrix fashion, while a porous alignment film, which has a porous film structure with a higher impurity adsorptive property than the former alignment film, is formed in a region outside the former alignment film, for example, in a region intermediate the display region and a seal region surrounded by a sealing material, whereby the porous alignment film formed in the region outside the display region can efficiently adsorb contaminants, such as residual impurity ions produced from the sealing material and uncured components of the sealing material, to prevent the contaminants from penetrating into the display region and being fixed therein.

4 Claims, 10 Drawing Sheets

LENGTHENED DIAMINE CHAIN

LIQUID CRYSTAL DISPLAY DEVICE AND METHOD OF FABRICATING THE SAME

This application is based upon and claims the benefit of priority from Japanese patent application No. 2007-105717, filed on Apr. 13, 2007, and Japanese patent application No. 2008-049315, filed on Feb. 29, 2008, the disclosure of which is incorporated herein in its entirety by reference.

BACKGROUND OF THE INVENTION

1. Field of the Invention

The present invention relates to a liquid crystal display device and a method of fabricating the same. In particularl, the present invention relates to a liquid crystal display device characterized by an alignment film formed on a substrate surface, and a method of fabricating the same.

2. Description of the Related Art

Liquid crystal display devices are widely used as display devices for AV equipment and OA equipment in view of their advantages including slimness, lightness in weight, and low power consumption. Such a liquid crystal display device includes: a liquid crystal panel in which a liquid crystal is sandwiched between a pair of substrates, one of which is formed with switching devices, such as TFTs (Thin Film Transistors), arranged in a matrix fashion (hereinafter will be referred to as "TFT substrate"), the other of which is formed with a color filter (CF), black matrix (BM), and the like (hereinafter will be referred to as "CF substrate"): a backlight unit for irradiating the liquid crystal panel with backlight; and other components.

FIG. 1 is a plan view showing the configuration of a CF substrate or TFT substrate forming a liquid crystal panel related to the present invention. In fabricating the liquid crystal panel, an alignment material is applied to both of the CF substrate and the TFT substrate to form an alignment film on each substrate in an alignment film application step. Methods of forming such an alignment film include an alignment film printing method, and an ink-jet method. In both of the methods, after application of the alignment film, a provisional drying step and a subsequent alignment film main baking step are performed on the alignment film to thermally imidize the alignment film, thereby obtaining a required alignment film. In general, such an alignment film is formed so as to cover a display region extending inwardly of a seal region to be applied with sealing material 104 (see Japanese Patent Laid-Open No. 2003-222887 and No. 2006-78930 with respect to the formation of the aforementioned alignment film).

FIG. 2 shows a sectional structure of a portion extending from an edge to the display region of a liquid crystal panel related to the present invention. As shown in FIG. 2, alignment film 106 is formed on each of the opposed faces of TFT substrate 102 and CF substrate 103 so as to cover the display region. Polarizing plates 102a and 103a are bonded to the backside of the TFT substrate and the CF substrate, respectively. When bias is applied to the liquid crystal panel, residual impurity ions produced from sealing material 104 penetrate into the display region and then are adsorbed on the surface of alignment film 106 which is undesirable. Also, uncured components of sealing material 104 exude with time and then are adsorbed on the surface of alignment film 106 under application of bias to the liquid crystal panel. As a result, pixels in which contaminants, such as residual impurity ions and uncured components, are fixed, give rise to visible defects such as stain and display unevenness. Here, "display unevenness" means the disarray of liquid crystal alignment and the local color change of the panel caused by interfusion of ionic impurity into liquid crystal material.

In attempt to solve this problem, Japanese Patent Laid-Open No. 2003-222887 noted above discloses a method in which a substrate surface, in a region intermediate between sealing material and the display region, is formed with projections and depressions thereby increasing the surface area of the alignment film which adsorbs contaminants before the contaminants reach the display region.

FIG. 3 shows a sectional structure of a portion extending from an edge to the display region of the liquid crystal panel of Japanese Patent Laid-Open No. 2003-222887. As shown in FIG. 3, the effect of adsorbing contaminants can be enhanced by an increase in the surface area of alignment film 206 resulting from the formation of projections and depressions 210 on the substrate surfaces. This method, however, cannot sufficiently suppress the penetration of contaminants into the display region.

Japanese Patent Laid-Open No. 2006-78930 noted above discloses a liquid crystal panel in which there is a difference in characteristics between an alignment film formed on a TFT substrate in a region surrounded by the display region and a sealing material forming region and an alignment film formed on a CF substrate in the region surrounded by the display region and the sealing material forming region. That is, Japanese Patent Laid-Open No. 2006-78930 discloses a method in which the opposed surfaces of the alignment films are imparted with different electrostatic properties to produce a potential difference between the display region and the region surrounded by the display region and the sealing material forming region, so that impurity ions are allowed to be adsorbed in the region surrounded by the display region and the sealing material forming region.

FIG. 4 shows a sectional structure of a portion extending from an edge to the display region of the liquid crystal panel of Japanese Patent Laid-Open No. 2006-78930. As shown in FIG. 4, by producing a potential difference between alignment films 306a and 306b, a surface portion of the alignment film which is charged differently from impurity ions can perform the effect of adsorbing such impurity ions. However, adsorption is inhibited on the alignment film side which bears the same charge as the impurity ions and, hence, the impurity ions are expected to diffuse into pixels. As a result, it is possible that a long-term reliability test eventually causes pixels to give rise to visible defects such as stain and display unevenness.

In this structure, the alignment film formed in the region intermediate between the display region and sealing material has the same film structure as the alignment film formed in the display region, on at least one substrate. For this reason, residual impurity ions produced from sealing material and uncured components of sealing material penetrate into the display region easily and are finally adsorbed on the alignment film surface. This results in a problem of lowered display quality.

SUMMARY OF THE INVENTION

The present invention has been made in view of the foregoing problems. A main object of the present invention is to provide a liquid crystal display device which is capable of suppressing the occurrence of visible defects caused by residual impurity ions and uncured components of a sealing material, thereby remarkably improving the reliability thereof, as well as a method of fabricating the same.

In order to accomplish the object mentioned above, a liquid crystal display device according to the present invention includes: a pair of substrates; an alignment film formed on each of opposed faces of the pair of substrates; a sealing material formed outside a display region of at least one of the substrates; and a liquid crystal material encapsulated between the pair of substrates, wherein: the alignment film comprises a first alignment film formed so as to cover at least the display region, and a second alignment film formed in a region lying outwardly of the first alignment film and inwardly of the sealing material; and the second alignment film has a higher ionic impurity adsorptive property than the first alignment film.

In the present invention, the second alignment film preferably has a porous film structure. To confirm such a porous film structure, samples cut out of the first and second alignment films are subjected to measurement using an automatic gas adsorption measuring instrument ("Belsorp 18 plus-T" manufactured by BEL JAPAN, INC.). It is possible to determine: a pore size distribution and a pore size capacity from an adsorption-desorption isotherm that has been obtained; pore size diameters of not more than 2 nm by Molecular-Probe method (MP method); and pore size diameters ranging from 2 to 200 nm by Dollimore-Heal method (DH method).

In the present invention, a diamine chain forming a main chain contained in the second alignment film may be longer than a diamine chain forming a main chain contained in the first alignment film. To confirm such diamine chains, samples extracted from the first and second alignment films are subjected to measurements using a gas chromatograph mass spectrometer ("JMS-GCmatell" manufactured by JEOL Ltd.) and a liquid chromatograph mass spectrometer ("JMS-T100LC model" manufactured by JEOL Ltd.). Information on the structures of such diamine chains can be obtained from the measurements.

In the present invention, the imidization rate of the second alignment film may be lower than that of the first alignment film. To confirm the imidization rates, samples extracted from the first and second alignment films are subjected to measurement using a Fourier transform infrared spectrophotometer ("FT/IR-610" manufactured by JASCO Corporation). The sample alignment films thus extracted are measured for their IR spectra by a KBr tablet method and the imidization rate of each sample can be calculated from a peak height ratio originating from an imide ring.

In the present invention, the second alignment film may have a larger film thickness than the first alignment film. To confirm the thicknesses of the alignment films, samples cut out of the first and second alignment films are subjected to measurement using a FIB-SEM hybrid system ("SMI3050SE" manufactured by SII Nanotechnology Inc.). Information on the thickness of each alignment film can be obtained by the measurement.

A method of fabricating a liquid crystal display device according to the present invention includes at least: applying an alignment film to a substrate surface, provisionally drying the alignment film; baking the alignment film; rubbing; and rubbing washing, which are performed in this sequence, wherein: in applying the alignment film, the alignment film is formed so as to cover at least a display region; and a portion of the alignment film which extends in a region outside the display region is imparted with an adsorptive property by modification during the process from provisional drying to rubbing washing.

In the present invention, the provisional drying may include raising a drying temperature locally for the region outside the display region to form a porous alignment film in the region outside the display region.

In the present invention, during a process from the baking to the rubbing washing, plasma ashing may be performed locally for the region outside the display region to form a porous alignment film in the region outside the display region.

Alternatively, a method of fabricating a liquid crystal display device according to the present invention includes at least: applying an alignment film to a substrate surface; provisionally drying the alignment film; baking the alignment film; rubbing; and rubbing washing, which are performed in this sequence, wherein in applying the alignment film, a portion of the alignment film which extends in a region outside a display region is imparted with an adsorptive property by applying the alignment film in such a manner that the portion of the alignment film which extends in the region outside the display region has a larger film thickness than a portion of the alignment film which extends in a region inside the display region.

In the present invention, in applying the alignment film, printing may be performed in such a manner that the portion of the alignment film which extends in the region outside the display region has a larger film thickness than the portion of the alignment film which extends in the region inside the display region by using an alignment plate having a portion facing the region outside the display region which has a smaller number of surface relieves or a smaller relief projection area, or a larger relief height than a portion thereof facing the region inside the display region.

In the present invention, in applying the alignment film, an ink-jet coater may be used in which coating conditions are established such that the region outside the display region receives a larger amount of a jetted alignment material or a larger number of jets of the alignment material than the region inside the display region, to make the portion of the alignment film which extends in the region outside the display region thicker than the portion of the alignment film which extends in the region inside the display region.

Thus, according to the present invention, the alignment film formed on each of CF and TFT substrate comprises the first alignment film covering at least the display region, and comprises the second alignment film formed in the region lying outwardly of the first alignment film and inwardly of the sealing material. Also, according to the present invention, the second alignment film is imparted with a higher ionic impurity adsorptive property than the first alignment film, whereby penetration of impurity ions or exudation of sealing material components with time can be suppressed by means of the second alignment film. As a result, the present invention makes it possible to provide a high-quality liquid crystal display device having remarkably improved reliability.

The liquid crystal display device and the fabrication method thereof according to the present invention are capable of preventing contaminants produced from the sealing material from penetrating into the display region and being fixed therein by forming an alignment film having a porous structure in the region outside the alignment film covering at least the display region. Also, by making the alignment film of the porous structure have an increased film thickness, it becomes possible to increase the effective surface area for adsorbing contaminants, thereby improving the contaminant adsorption efficiency.

By virtue of these advantages, it becomes possible to provide a high-quality liquid crystal display device having remarkably improved reliability. Also, the present invention can improve the effective impurity adsorption efficiency while maintaining the narrow picture-frame structure of the liquid crystal panel. Further, use of the same alignment material enables the construction of the present invention to be realized by a simple process and allows a reduction in the amount of alignment material that is used and shortening of the lead time that can be realized by eliminating the time and labor required to change the kind of alignment material.

DETAILED DESCRIPTION OF THE EXEMPLARY EMBODIMENTS

As described in the related art of the present invention, when bias is applied to a liquid crystal panel, residual impurity ions produced from a sealing material penetrate into a display region. Also, sealing material 4 exude uncured components over time. Alignment film 6 in the display region adsorbs contaminants including such impurity ions and uncured components. This results in a problem that pixels in which the contaminants are fixed give rise to visible defects such as stain and display unevenness.

As a principle of adsorption of contaminants and the like by the alignment film, it is conceivable that a polyamic acid (unreacted component) contained in the alignment film attracts impurity ions. Usually, a polyimide is produced from the polyamic acid by an alignment film baking step. The alignment film thermally imidized contains at least 10% to 15% of the polyamic acid as a residue.

Figure 12A:
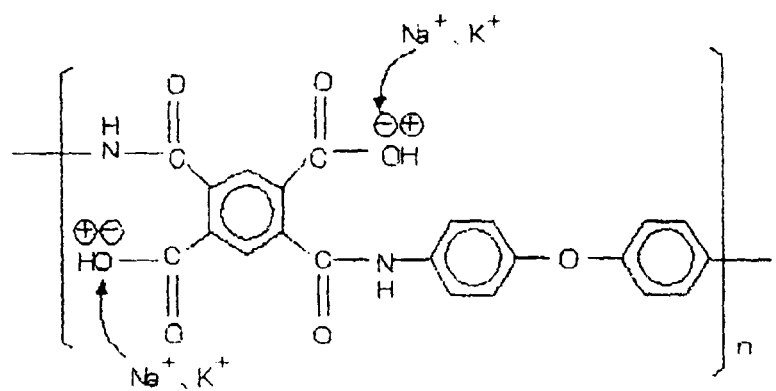
FIG. 12A is a diagram showing an exemplary molecular structure of a polyamic acid.

The polyamic acid has a carbonyl group, and a CO—OH group attracts impurity ions of Na and K thereby adsorbing the impurity ions (see FIG. 12A). Contaminants other than the impurity ions penetrate into minute pores and then are physically adsorbed in pores fitting their respective molecular weight sizes.

In view of the above, the present invention forms an alignment film covering at least the display region, and a porous alignment film having a higher ionic impurity adsorptive property than the former alignment film in a region outside the alignment film covering at least the display region, whereby the porous alignment film efficiently adsorbs contaminants in the region outside the display region and prevents the contaminants from penetrating into the display region and being fixed therein. Hereinafter, description will be made with reference to the drawings.

Figure 1:
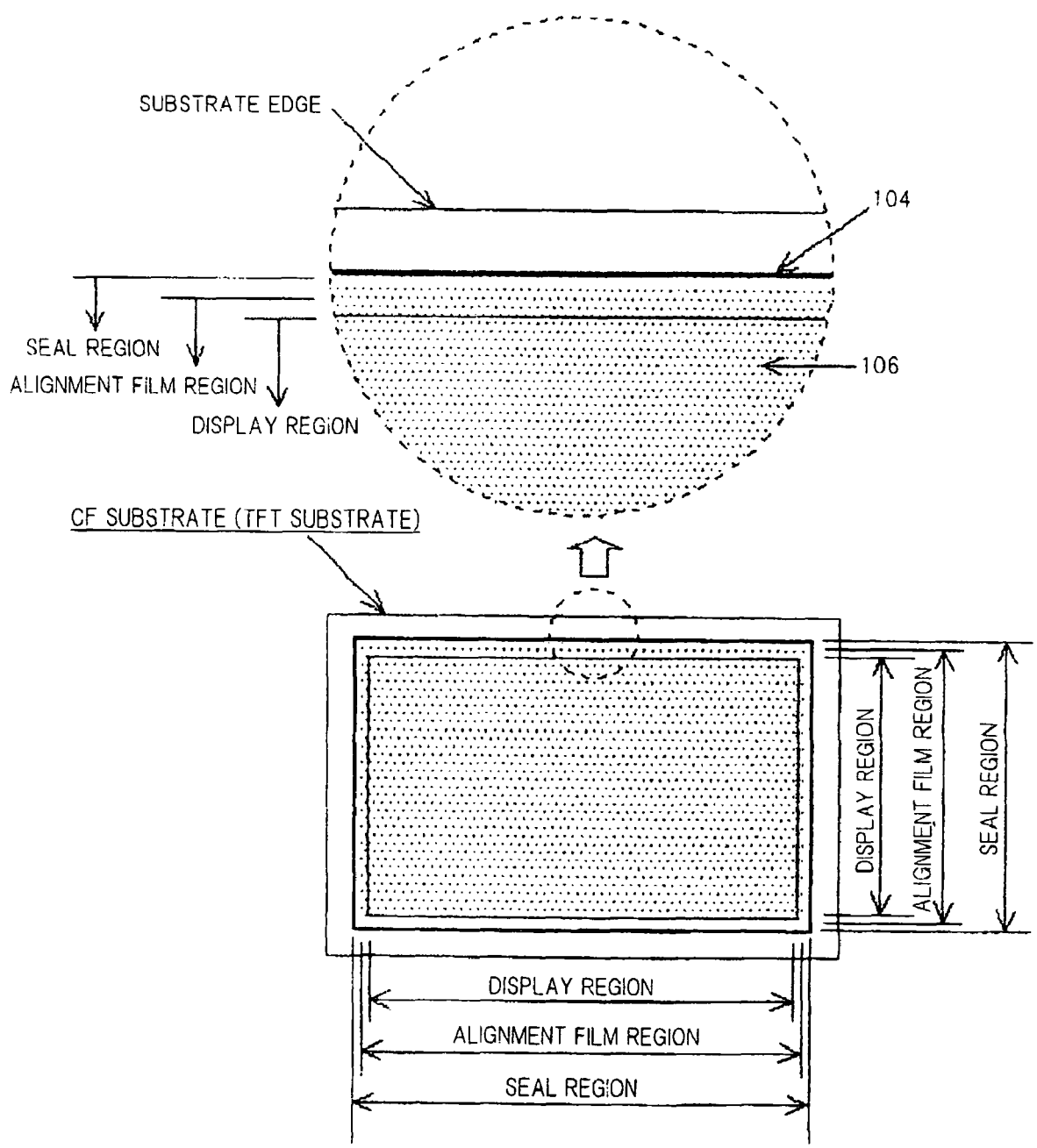
FIG. 1 is a plan view showing the configuration of a CF substrate or TFT substrate forming a liquid crystal panel related to the present invention.
Figure 2:
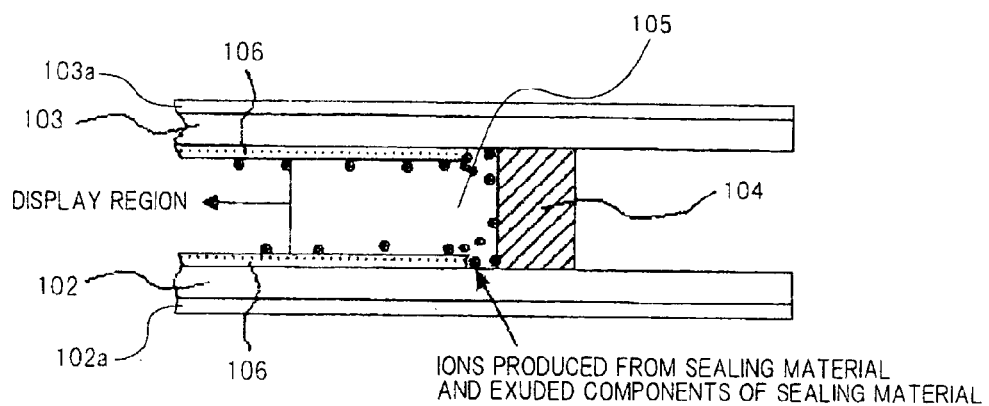
FIG. 2 is a sectional view showing the structure of a portion extending from an edge to a display region of a liquid crystal panel related to the present invention.
Figure 3:
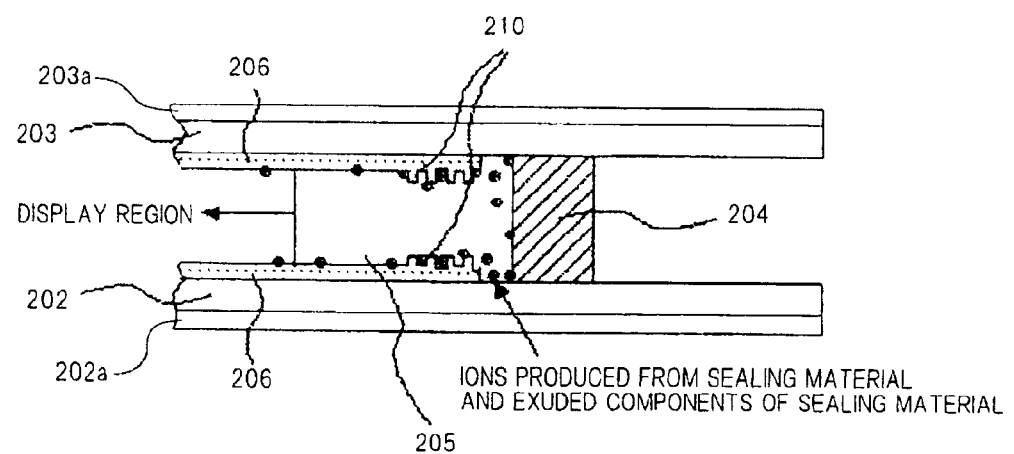
FIG. 3 is a sectional view showing the structure of a portion extending from an edge to a display region of a liquid crystal panel (Japanese Patent Laid-Open No. 2003-222887) related to the present invention.
Figure 4:
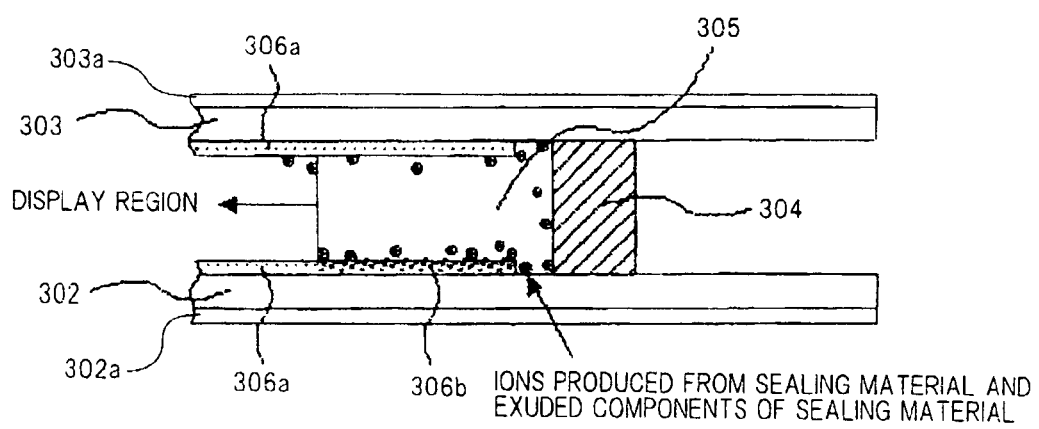
FIG. 4 is a sectional view showing the structure of a portion extending from an edge to a display region of a liquid crystal panel (Japanese Patent Laid-Open No. 2006-78930) related to the present invention.
Figure 5:
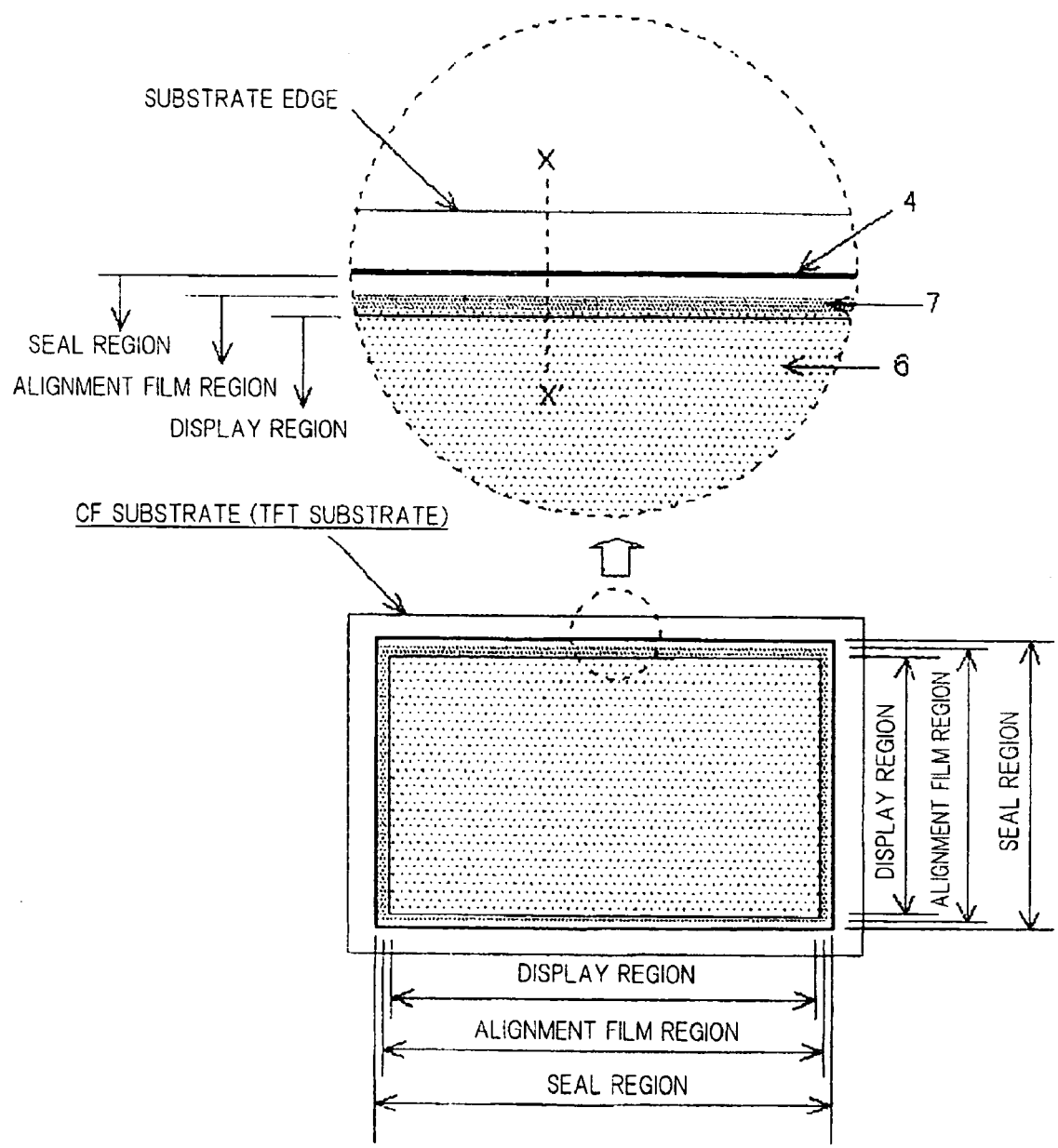
FIG. 5 is a plan view showing the configuration of a CF substrate or TFT substrate forming a liquid crystal panel according to one exemplary embodiment of the present invention.
Figure 6:
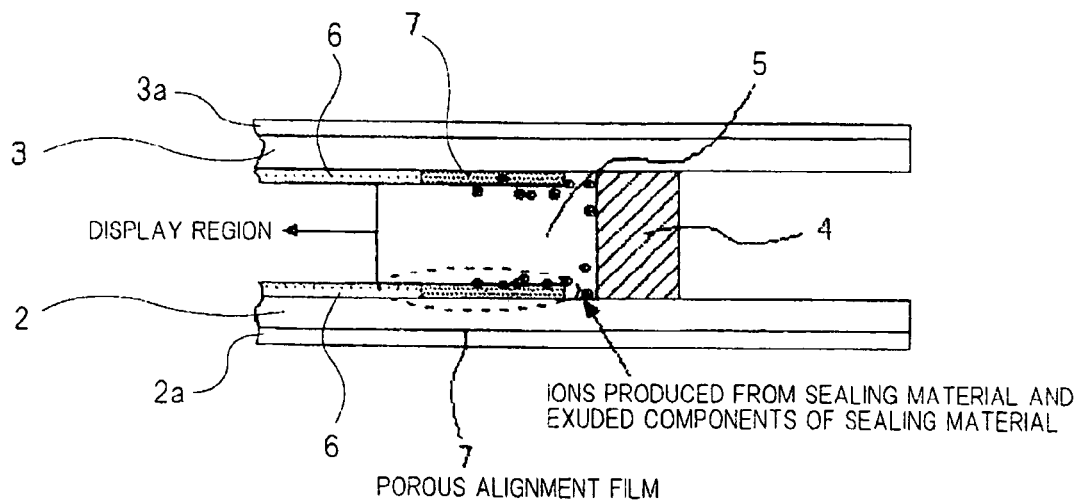
FIG. 6 is a sectional view showing the structure of a portion extending from an edge to a display region of a liquid crystal panel according to one exemplary embodiment of the present invention.

FIG. 5 is a plan view showing the configuration of a CF substrate or TFT substrate forming a liquid crystal panel according to one exemplary embodiment of the present invention; FIG. 6 is a sectional view showing the structure of a portion cut on line X-X' of FIG. 5; and FIG. 7 is an enlarged view of a portion encircled with a circle in FIG. 6.

As shown in FIG. 6, alignment film 6 is formed on each of the opposed faces of TFT substrate 2 and CF substrate 3 so as to cover the display region. Polarizing plates 2a and 3a are bonded to the backside of the TFT substrate and the CF substrate, respectively.

As shown in FIGS. 5 and 6, in an alignment film application step, generally an alignment material is applied to the surfaces of a CF substrate and a TFT substrate to form alignment films.

At that time, alignment film 6 is formed so as to cover the display region in which pixels are arranged in a matrix fashion, while porous alignment film 7 is formed in a region outside alignment film 6. For example, alignment film 7 having a porous film structure with a higher impurity adsorptive property than alignment film 6 is formed in a region intermediate between the display region and a seal region surrounded by sealing material 4. That is, the provision of porous alignment film 7 makes it possible to efficiently adsorb impurities in the region outside the display region.

It is sufficient that alignment film 6 is formed in a region covering at least the display region and porous alignment film 7 formed outside the display region.

When liquid crystal material 5 is encapsulated, liquid crystal material 5 is brought into contact with a surface portion of sealing material 4, causing residual impurity ions of Na, K, Cl and the like to begin moving from the surface portion of sealing material 4 into liquid crystal material 5. When the liquid crystal panel is applied with bias, these residual impurity ions move more noticeably and are adsorbed on the surfaces of the alignment films. Under the application of bias to the liquid crystal panel, uncured components and the like of sealing material 4 begin being eluted over time and are then adsorbed on the surfaces of the alignment films like the residual impurity ions.

In the structure of the present exemplary embodiment, however, porous alignment film 7 is formed in the region outside the display region. For this reason, porous alignment film 7 efficiently adsorbs contaminants including residual impurity ions and uncured components, thereby making it possible to prevent such contaminants from penetrating into the display region and being fixed therein. As a result, a high-quality liquid crystal display device with remarkably improved reliability can be provided.

Figure 7A:
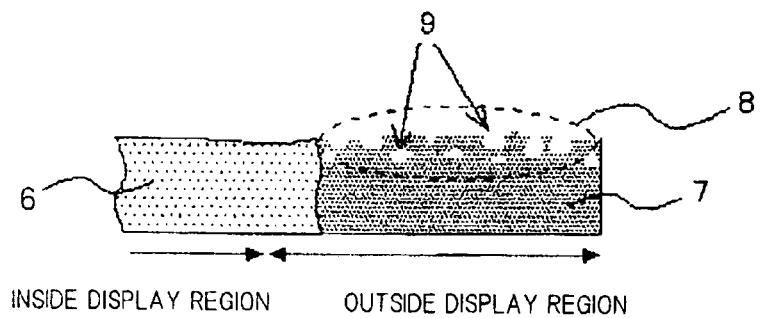
FIG. 7A is a sectional view schematically showing the structure of a porous alignment film according to one exemplary embodiment of the present invention.

FIG. 7A is a view schematically showing the structure of porous alignment film 7 described above. Porous alignment film 7 has pores 9 not only in its surface portion but also in its internal portion and hence functions as ion adsorbing layer 8.

Pores 9 having pore size diameters of not more than about 50 nm (ranging from a mesopore size to a micropore size) adsorb the residual impurity ions of Na, K, Cl and the like effectively. Pores 9 having pore size diameters from 20 to 200 nm (ranging from a mesopore size to a macropore size) adsorb the uncured components of sealing material 4 effectively. Therefore, the diameters of pores 9 are easily set within this range. Pores 9 of porous alignment film 7 according to the present invention preferably have diameters of not more than about 50 nm. Particularly effectively, porous alignment film 7 has a wide pore size distribution ranging from a mesopore size to a micropore size.

Methods of forming porous alignment film 7 described above include, for example, a method wherein the drying temperature is raised to a high temperature locally for an alignment film application region outside the display region in a provisional drying step included in the alignment film application step. This method is capable of causing the solvent contained in the alignment material to rapidly evaporate causing imidization to accelerate, thereby making the film nondense. In this way, a porous film can be formed.

Another forming method includes ashing the alignment film formed in an alignment film application region outside the display region by using an ashing system, such as a plasma processing system, to provide the alignment film with minute pores, thereby making it possible to form a porous film.

Alternatively, there is a method including: mixing the alignment material with a substance which can be later extracted by a solvent; forming an alignment film in the alignment film application region outside the display region; and then extracting the above-mentioned substance by means of the solvent to form minute pores. In this case, the extractable substance to be used has to be a substance that can be dissolved without any effect on the alignment material component.

Yet, there is a method including: further mixing a minute filler into the alignment material; forming the alignment film in the alignment film application region outside the display region; and then removing the filler physically to form minute pores.

Figure 8:
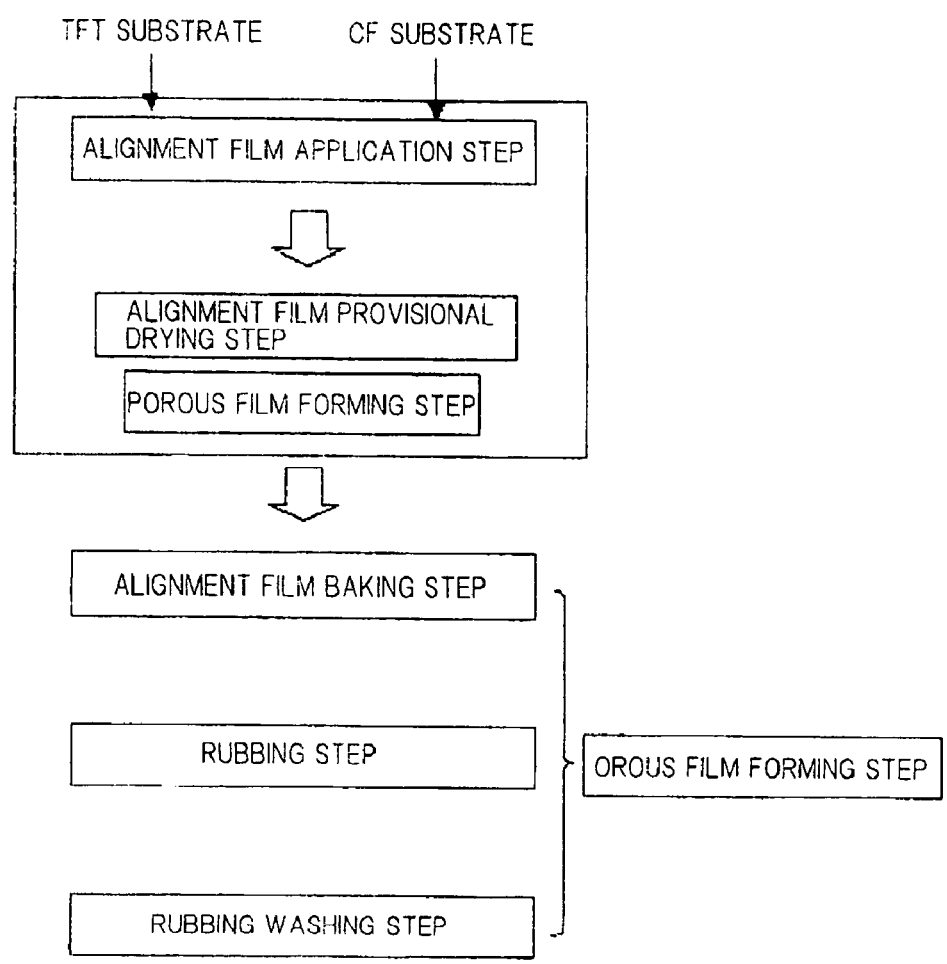
FIG. 8 is a flowchart illustrating a part of a liquid crystal display device fabricating process according to one exemplary embodiment of the present invention.

Referring to the flowchart shown in FIG. 8, proposal can be made of for fabrication methods which include: a method in which a leveling step is provided for forming the porous alignment film in the provisional drying step included in the alignment film application step; and a method that includes an ashing step, a solvent extraction step and a filler removing step for forming the porous alignment film during the process from an alignment film baking step to a rubbing washing step. To make the film more porous, these methods are each desirably performed in combination with the above-described porous alignment film forming step.

Figure 7B:
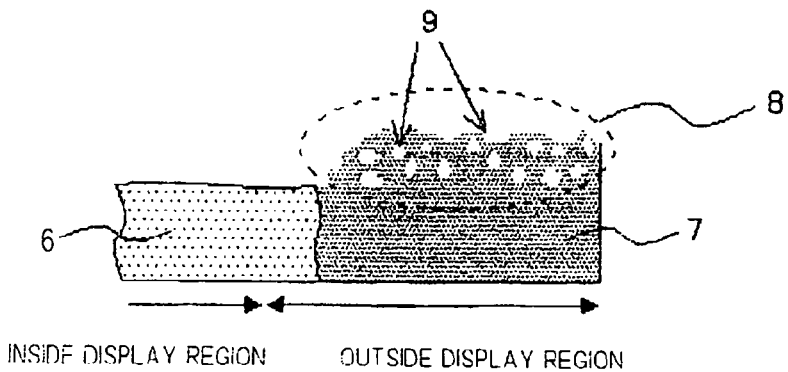
FIG. 7B is a sectional view schematically showing the structure of a porous alignment film having an increased film thickness which is formed in a region outside a display region according to one exemplary embodiment of the present invention.

In order to improve the impurity adsorption efficiency, as shown in FIG. 7B, the alignment film thickness may be increased in the region outside the display region by providing the porous alignment film, thereby increasing the effective adsorption surface area. According to the present invention, the alignment film thickness in the display region is selected from a range from 10 to 200 nm in accordance with the types of panels. By making the porous alignment film in the region outside the display region have a larger film thickness than the alignment film in the display region, impurities can be adsorbed more effectively.

In the case of an alignment film printing method, for example, the porous alignment film thickness in the region outside the display region can be increased by reducing the number of relieves on a surface portion of an alignment plate that faces the alignment film application region outside the display region to a value smaller than the number of relieves on a surface portion of the alignment plate that faces the alignment film application region inside the display region. In this case, the relieves facing the alignment film application regions inside and outside the display region need to have a constant relief diameter (i.e., relief projection area). Similarly, the porous alignment film thickness in the region outside the display region can be increased by reducing the relief projection area or increasing the relief height in the alignment film application region outside the display region. Needless to say, a more advantageous effect will result when the reduction in the number of relieves, a reduction in the relief projection area and an increase in the relief height are combined together. In the case of an ink-jet method, the porous alignment film thickness in the region outside the display region can be increased by increasing the jetted amount of the alignment material or the number of jets of the alignment material for the alignment film application region outside the display region, as compared with the alignment film application region inside the display region.

Hereinafter, the present invention will be described by way of exemplary embodiments, which, in no way, limits the present invention unless the following exemplary embodiments change the concept of the present invention.

Exemplary Embodiment 1

First, description will be made of a liquid crystal display device and a fabrication method thereof according to a first exemplary embodiment of the present invention with reference to FIG. 9.

In general, a liquid crystal display panel has a TFT substrate formed with switching devices, such as TFTs, arranged in a matrix fashion, and a CF substrate formed with a black matrix, color filter (CF), and the like. Opposed faces of these substrates are each formed with an alignment film that is treated for alignment. A predetermined gap is defined between the two substrates by positioning insulating spacers, such as polymer beads or silica beads of a predetermined shape, or insulating columns of an acrylic resin or the like. Such a liquid crystal display panel displays an image by controlling the alignment direction of liquid crystal encapsulated in the gap by means of an electric field produced by electrodes formed on at least one substrate.

In order to fabricate a high-quality liquid crystal display device having remarkably improved reliability, it is necessary to prevent contaminants from penetrating into the display region and from being fixed to a surface portion of the alignment film. For this purpose, the present exemplary embodiment fabricates a liquid crystal panel according to the following method.

Figure 9:
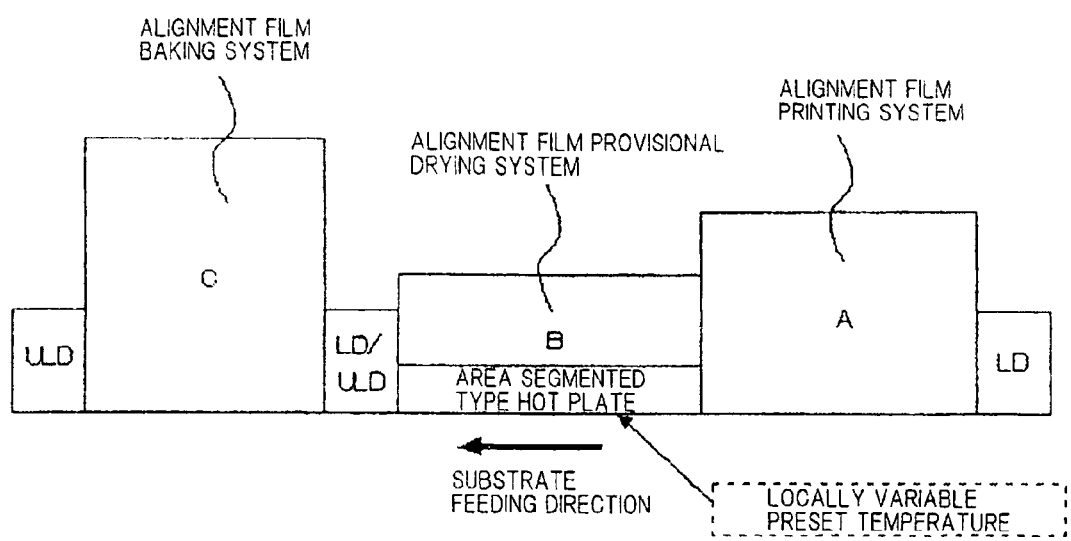
FIG. 9 is a schematic view illustrating a process from an alignment film application step to an alignment film baking step according to a first exemplary embodiment of the present invention.

FIG. 9 is a schematic view illustrating a process from an alignment film application step to an alignment film baking step for fabricating a liquid crystal panel according to the present invention.

In the alignment film application step, printing using an alignment plate was performed to apply an alignment material to surfaces of the TFT substrate and CF substrate, thus providing the display region and the region outside the display region with alignment films (step A in FIG. 9).

In a subsequent alignment film provisional drying step, the drying temperature of a hot plate located outside the display region was locally raised so as to enable leveling to be performed at about 80° C. to 90° C. for the display region and at about 120° C. to 150° C., which was higher than the former temperature, for the region outside the display region (step B in FIG. 9). This step makes it possible to form an alignment film with controls print quality in the display region and to form a porous alignment film in the region outside the display region while shortening the provisional drying lead time.

In the subsequent alignment film baking step, each alignment film in the display region and in the region outside the display region was thermally imidized by being subjected to main baking, to give a required alignment film (step C in FIG. 9).

Thereafter, in a rubbing step, rubbing was performed on the alignment film surfaces of the TFT substrate and CF substrate by means of a rubbing roll made of rayon.

Subsequently, in a rubbing washing and drying step, the alignment film surfaces and the reverse sides of the TFT substrate and CF substrate were subjected to chemical cleaning and pure water cleaning and then to IR drying at 185° C.

Subsequently, in a seal application step, a sealing material was applied to predetermined positions on the TFT substrate so as to provide a peripheral (auxiliary) seal and a main seal each describing a shape of a closed loop. (In fabricating a TN mode liquid crystal display panel, the sealing material is mixed with Au balls serving as conductors.)

Subsequently, in a liquid crystal dispensing step, a predetermined amount of a liquid crystal material was dispensed dropwise in a matrix fashion (i.e., in a manner to form multiple dots in a matrix) in a region inside the main seal.

Thereafter, in a panel alignment step, the TFT substrate and the CF substrate were brought into contact with each other and then compressed to diffuse the liquid crystal material uniformly throughout a pixel region and a peripheral region between the substrates and to define a uniform gap between the substrates using columns.

Subsequently, before feeding the panel to a UV curing step, the sealing material was provisionally fixed by partially subjecting the peripheral seal to provisional UV curing at several points, in order to prevent the aligned substrates from being displaced from their fitted state.

In the subsequent UV curing step, the sealing material was cured by irradiation with ultraviolet rays of 3,000 mJ.

Further, in a thermal curing step, the sealing material was completely cured by heating at 120° C. Then, the manufacturing of a liquid crystal display panel is completed by bonding polarizing plates to the backside of the TFT substrate and the CF substrate.

Thereafter, the liquid crystal display panel thus fabricated was subjected to an ACF (Anisotropic Conductive Film) attaching/TCP (Tape Carrier Package) bonding step and a substrate bonding step and then fitted with a backlight source in an assembling step, to complete a liquid crystal display device.

The liquid crystal display device according to the present exemplary embodiment was subjected to a reliability test. An operation test in an environment having a temperature of 60° C. and a humidity of 60% was conducted on five liquid crystal display devices according to the present exemplary embodiment and on five comparative liquid crystal display devices related to the present invention. As a result, the liquid crystal display devices related to the present invention each gave rise to display unevenness, spot stain and the like in a peripheral portion of the panel within 500 hours from the starting of the test, whereas any one of the liquid crystal display devices according to the present exemplary embodiment did not give rise to stain or display unevenness. Further, neither stain nor display unevenness was observed in any one of the liquid crystal display devices according to the present exemplary embodiment even after a lapse of 1,000 hours from the starting of the test.

Exemplary Embodiment 2

Description will be made of a liquid crystal display device and a fabrication method thereof according to a second exemplary embodiment of the present invention with reference to FIG. 10.

Figure 10:
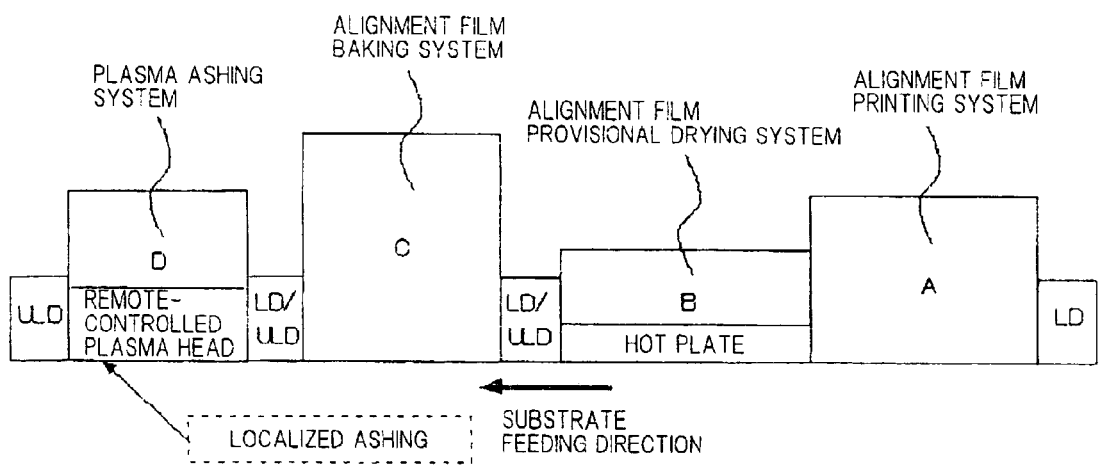
FIG. 10 is a schematic view illustrating a process from an alignment film application step to a plasma ashing step according to a second exemplary embodiment of the present invention.

FIG. 10 is a schematic view illustrating a process from an alignment film application step to a plasma ashing step for fabricating a liquid crystal display panel according to the present exemplary embodiment.

In the alignment film application step, printing using an alignment plate was performed to apply the alignment material to surfaces of the TFT substrate and CF substrate, thus providing the display region and the region outside the display region with alignment films (step A in FIG. 10), in the same manner as in the first exemplary embodiment.

In the subsequent alignment film provisional drying step, leveling was performed at 80° C. for both the display region and the region outside the display region (step B in FIG. 10).

In the subsequent alignment film baking step, main baking was performed at 230° C. to provide required alignment films (step C in FIG. 10).

Subsequently, the plasma ashing step was performed to form porous alignment films (step D in FIG. 10). Here, localized ashing was performed on the alignment films in the region outside the display region. A remote-controlled plasma head was driven to locally irradiate with plasma the region outside the display region to be subjected to ashing, to form minute pores in the alignment films. Thus, porous alignment films were formed. Oxygen or a mixed gas of nitrogen and oxygen was used as a process gas.

Thereafter, in the rubbing step, rubbing was performed on the alignment film surfaces of the TFT substrate and CF substrate by means of a rubbing roll made of rayon.

Subsequently, in the rubbing washing and drying step, the alignment film surfaces and the reverse sides of the TFT substrate and CF substrate were subjected to chemical cleaning and pure water cleaning and then to IR drying at 185° C.

Subsequently, in the seal application step, the sealing material was applied to predetermined positions on the TFT substrate so as to provide a peripheral (auxiliary) seal and a main seal each describing a shape of a closed loop. (In fabricating a TN mode liquid crystal display panel, the sealing material is mixed with Au balls serving as conductors.)

Subsequently, in the liquid crystal dispensing step, a predetermined amount of the liquid crystal material was dispensed dropwise in a matrix fashion (i.e., in a manner to form multiple dots in a matrix) in a region inside the main seal.

Thereafter, in the panel alignment step, the TFT substrate and the CF substrate were brought into contact with each other and then compressed to diffuse the liquid crystal material uniformly throughout a pixel region and a peripheral region between the substrates and to define a uniform gap between the substrates using columns.

Subsequently, before feeding the panel to the UV curing step, the sealing material was provisionally fixed by partially subjecting the peripheral seal to provisional UV curing at several points, in order to prevent the aligned substrates from being displaced from their fitted state.

In the subsequent UV curing step, the sealing material was cured by irradiation with ultraviolet rays of 3,000 mJ.

Further, in the thermal curing step, the sealing material was completely cured by heating at 120° C. Then, the manufacturing of a liquid crystal display panel is completed by bonding polarizing plates to the backside of the TFT substrate and the CF substrate.

Thereafter, the liquid crystal display panel thus fabricated was subjected to the ACF attaching/TCP bonding step and the substrate bonding step and then fitted with a backlight source in the assembling step, to complete the manufacturing of a liquid crystal display device. Even when the rubbing step was performed before the plasma ashing step, the condition of porous alignment film 7 formed was satisfactory similarly.

The liquid crystal display device according to the present exemplary embodiment was subjected to a reliability test. An operation test in an environment having a temperature of 60° C. and a humidity of 60% was conducted on five liquid crystal display devices according to the present exemplary embodiment and on five comparative liquid crystal display devices related to the present invention. As a result, the liquid crystal display devices related to the present invention each gave rise to display unevenness, spot stain and the like in a peripheral portion of the panel within 500 hours from the starting of the test, whereas none of the liquid crystal display devices according to the present exemplary embodiment gave rise to stain or display unevenness. Further, neither stain nor display unevenness was observed in any one of the liquid crystal display devices according to the present exemplary embodiment even after a lapse of 1,000 hours from the starting of the test.

Exemplary Embodiment 3

Description will be made of a liquid crystal display device and a fabrication method thereof according to a third exemplary embodiment of the present invention.

In the same manner as in the above-described second exemplary embodiment, the process from the alignment film application to the alignment film baking was performed to provide required alignment films in the display region and the region outside the display region.

In the subsequent plasma ashing step, the surface of each substrate except the region outside the display region was covered with a mask to allow the alignment film in the region outside the display region to be ashed locally. The entire substrate surface was directly irradiated with plasma by means of a fixed plasma head to form minute pores in the alignment film only in the region outside the display region. Thus, porous alignment films were formed.

Thereafter, in the rubbing step, rubbing was performed on the alignment film surfaces of the TFT substrate and CF substrate by means of a rubbing roll made of rayon.

Subsequently, in the rubbing washing and drying step, the alignment film surfaces and the reverse sides of the TFT substrate and CF substrate were subjected to chemical cleaning and pure water cleaning and then to IR drying at 185° C.

Subsequently, in the seal application step, the sealing material was applied to predetermined positions on the TFT substrate so as to provide a peripheral (auxiliary) seal and a main seal each describing a shape of a closed loop. (In fabricating a TN mode liquid crystal display panel, the sealing material is mixed with Au balls serving as conductors.)

Subsequently, in the liquid crystal dispensing step, a predetermined amount of the liquid crystal material was dispensed dropwise in a matrix fashion (i.e., in a manner to form multiple dots in a matrix) in a region inside the main seal.

Thereafter, in the panel alignment step, the TFT substrate and the CF substrate were brought into contact with each other and then compressed to diffuse the liquid crystal material uniformly throughout a pixel region and a peripheral region between the substrates and to define a uniform gap between the substrates using columns.

Subsequently, before feeding the panel to the UV curing step, the sealing material was provisionally fixed by partially subjecting the peripheral seal to provisional UV curing at several points, in order to prevent the aligned substrates from being displaced from their fitted state.

In the subsequent UV curing step, the sealing material was cured by irradiation with ultraviolet rays of 3,000 mJ.

Further, in the thermal curing step, the sealing material was completely cured by heating at 120° C. Then, the manufacturing of a liquid crystal display panel is completed by bonding polarizing plates to the backside of the TFT substrate and the CF substrate.

Thereafter, the liquid crystal display panel thus fabricated was subjected to the ACF attaching/TCP bonding step and the substrate bonding step and then fitted with a backlight source in the assembling step, to complete the manufacture of liquid crystal display device.

The liquid crystal display device according to the present exemplary embodiment was subjected to a reliability test. An operation test in an environment having a temperature of 60° C. and a humidity of 60% was conducted on three liquid crystal display devices according to the present exemplary embodiment and on three comparative liquid crystal display devices related to the present invention. As a result, the liquid crystal display devices related to the present invention each gave rise to display unevenness, spot stain and the like in a peripheral portion of the panel within 500 hours from the starting of the test, whereas none of the liquid crystal display devices according to the present exemplary embodiment gave rise to stain or display unevenness, like the liquid crystal display devices according to the second exemplary embodiment. Further, neither stain nor display unevenness was observed in any one of the liquid crystal display devices according to the present exemplary embodiment even after a lapse of 1,000 hours from the starting of the test.

Exemplary Embodiment 4

Description will be made of a liquid crystal display device and a fabrication method thereof according to a fourth exemplary embodiment of the present invention.

In the same manner as in the above-described first exemplary embodiment, printing using an alignment plate was performed to apply the alignment material to surfaces of the TFT substrate and CF substrate in the alignment film application step, thus providing the display region and the region outside the display region with alignment films (step A in FIG. 9). The printing plate used at that time had a smaller number of relieves on an alignment plate surface portion that faces the alignment film application region outside the display region than on an alignment plate surface portion that faces the alignment film application region inside the display region, so that the alignment film thickness in the region outside the display region became larger than in the display region.

In the subsequent alignment film provisional drying step, the drying temperature of a hot plate located outside the display region was locally raised so as to enable leveling to be performed at 80° C. for the display region and at 120° C., which was higher than 80° C., for the region outside the display region in the same manner as in the first exemplary embodiment, thus forming porous alignment films only in the region outside the display region (step B in FIG. 9).

In the subsequent alignment film baking step, each alignment film in the display region and the region outside the display region was thermally imidized by being subjected to main baking at 230° C., to provide a required alignment film (step C in FIG. 9). In this way, the area of the porous alignment films in the region outside the display region was increased as compared with the first exemplary embodiment, thereby making it possible to increase the effective adsorption surface area.

Thereafter, in the rubbing step, rubbing was performed on the alignment film surfaces of the TFT substrate and CF substrate by means of a rubbing roll made of rayon.

Subsequently, in the rubbing washing and drying step, the alignment film surfaces and the reverse sides of the TFT substrate and CF substrate were subjected to chemical cleaning and pure water cleaning and then to IR drying at 185° C.

Subsequently, in the seal application step, the sealing material was applied to predetermined positions on the TFT substrate so as to provide a peripheral (auxiliary) seal and a main seal each describing a shape of a closed loop. (In fabricating a TN mode liquid crystal display panel, the sealing material is mixed with Au balls serving as conductors.)

Subsequently, in the liquid crystal dispensing step, a predetermined amount of the liquid crystal material was dispensed dropwise in a matrix fashion (i.e., in a manner to form multiple dots in a matrix) in a region inside the main seal.

Thereafter, in the panel alignment step, the TFT substrate and the CF substrate were brought into contact with each other and then compressed to diffuse the liquid crystal material uniformly throughout a pixel region and a peripheral region between the substrates and to define a uniform gap between the substrates using columns.

Subsequently, before feeding the panel to a UV curing step, the sealing material was provisionally fixed by partially subjecting the peripheral seal to provisional UV curing at several points, in order to prevent the aligned substrates from being displaced from their fitted state.

In the subsequent UV curing step, the sealing material was cured by irradiation with ultraviolet rays of 3,000 mJ.

Further, in the thermal curing step, the sealing material was completely cured by heating at 120° C. Then, the manufacturing of a liquid crystal display panel is completed by bonding polarizing plates to the backside of the TFT substrate and the CF substrate.

Thereafter, the liquid crystal display panel thus fabricated was subjected to the ACF attaching/TCP bonding step and the substrate bonding step and then fitted with a backlight source in the assembling step, to complete the manufacture of a liquid crystal display device.

The liquid crystal display device according to the present exemplary embodiment was subjected to a reliability test. An operation test in an environment having a temperature of 60° C. and a humidity of 60% was conducted on five liquid crystal display devices according to the present exemplary embodiment and on five comparative liquid crystal display devices related to the present invention. As a result, the liquid crystal display devices related to the present invention each gave rise to display unevenness, spot stain and the like in a peripheral portion of the panel within 500 hours from the start of the test, whereas none of the liquid crystal display devices according to the present exemplary embodiment gave rise to stain or display unevenness, like the first exemplary embodiment. Further, neither stain nor display unevenness was observed in any one of the liquid crystal display devices according to the present exemplary embodiment even after a lapse of 1,500 hours from the starting of the test. Thus, the liquid crystal display devices according to the present exemplary embodiment were in a good display condition.

Exemplary Embodiment 5

Description will be made of a liquid crystal display device and a fabrication method thereof according to a fifth exemplary embodiment of the present invention with reference to FIG. 11.

Figure 11:
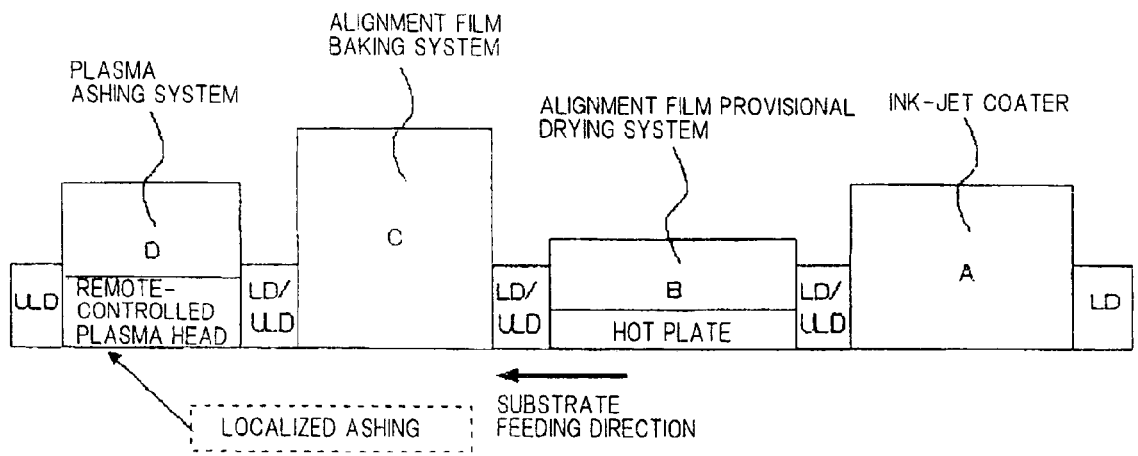
FIG. 11 is a schematic view illustrating a process from an alignment film application step to a plasma ashing step according to a fifth exemplary embodiment of the present invention.

FIG. 11 is a schematic view illustrating a process from the alignment film application step to the plasma ashing step for fabricating the liquid crystal panel according to the present exemplary embodiment.

In the alignment film application step, an ink-jet coater was used to apply the alignment material to surfaces of the TFT substrate and CF substrate, thus providing the display region and the region outside the display region with alignment films (step A in FIG. 11). At that time, the alignment material jetting conditions were established such that the alignment film application region outside the display region received a larger jetted amount of the alignment material and a larger number of jets of the alignment material than the alignment film application region inside the display region, to make the alignment film thickness larger in the region outside the display region than in the display region.

In the subsequent alignment film provisional drying step, leveling was performed at 80° C. for both the display region and the region outside the display region (step B in FIG. 11).

In the subsequent alignment film baking step, main baking was performed at 230° C. to provide the required alignment films (step C in FIG. 11).

Subsequently, the plasma ashing step was performed to form porous alignment films (step D in FIG. 11). Here, localized ashing was performed on each alignment film in the region outside the display region, in the same manner as in the second exemplary embodiment. Localized plasma irradiation was performed using a remote-controlled plasma head to form minute pores in the alignment films, thus forming the porous alignment films. Oxygen or a mixed gas of nitrogen and oxygen was used as a process gas. As a result, the area of the porous alignment films in the region outside the display region was increased as compared with the second exemplary embodiment, thereby making it possible to increase the effective adsorption surface area.

Thereafter, in the rubbing step, rubbing was performed on the alignment film surfaces of the TFT substrate and CF substrate by means of a rubbing roll made of rayon.

Subsequently, in the rubbing washing and drying step, the alignment film surfaces and the reverse sides of the TFT substrate and CF substrate were subjected to chemical cleaning and pure water cleaning and then to IR drying at 185° C.

Subsequently, in the seal application step, the sealing material was applied to predetermined positions on the TFT substrate so as to provide a peripheral (auxiliary) seal and a main seal each describing a shape of a closed loop. (In fabricating a TN mode liquid crystal display panel, the sealing material is mixed with Au balls serving as conductors.)

Subsequently, in the liquid crystal dispensing step, a predetermined amount of the liquid crystal material was dispensed dropwise in a matrix fashion (i.e., in a manner to form multiple dots in a matrix) in a region inside the main seal.

Thereafter, in the panel alignment step, the TFT substrate and the CF substrate were brought into contact with each other and then compressed to diffuse the liquid crystal material uniformly throughout a pixel region and a peripheral region between the substrates and to define a uniform gap between the substrates using columns.

Subsequently, before feeding the panel to the UV curing step, the sealing material was provisionally fixed by partially subjecting the peripheral seal to provisional UV curing at several points, in order to prevent the aligned substrates from being displaced from their fitted state.

In the subsequent UV curing step, the sealing material was cured by irradiation with ultraviolet rays of 3,000 mJ. Further, in the thermal curing step, the sealing material was completely cured by heating at 120° C. Then, the manufacturing of a liquid crystal display panel is completed by bonding polarizing plates to the backside of the TFT substrate and the CF substrate.

Thereafter, the liquid crystal display panel thus fabricated was subjected to the ACF attaching/TCP bonding step and the substrate bonding step and then fitted with a backlight source in the assembling step, to complete manufacture of a liquid crystal display device.

The liquid crystal display device according to the present exemplary embodiment was subjected to a reliability test. An operation test in an environment having a temperature of 60° C. and a humidity of 60% was conducted on five liquid crystal display devices according to the present exemplary embodiment and on five comparative liquid crystal display devices related to the present invention. As a result, the liquid crystal display devices related to the present invention each gave rise to display unevenness, spot stain and the like in a peripheral portion of the panel within 500 hours from the start of the test, whereas none of the liquid crystal display devices according to the present exemplary embodiment gave rise to stain or display unevenness, like the second exemplary embodiment. Further, neither stain nor display unevenness was observed in any one of the liquid crystal display devices according to the present exemplary embodiment even after a lapse of 1,500 hours from the start of the test. Thus, the liquid crystal display devices according to the present exemplary embodiment were in a good display condition.

Exemplary Embodiment 6

Description will be made of a liquid crystal display device and a fabrication method thereof according to a sixth exemplary embodiment of the present invention with reference to FIGS. 12A, 12B and 13.

In each of the above-described exemplary embodiments 1 to 5, it is possible to use alignment material prepared by using a polyamic acid molecule having a lengthened diamine chain forming a main chain of a polyamic acid, in order to provide the region outside the display region with alignment films to similarly fabricate a liquid crystal panel.

For example, an alignment material prepared using a polyamic acid molecule as shown in FIG. 12A is used to form alignment films in the display region. To form alignment films in the region outside the display region, an alignment material prepared using a polyamic acid molecule having a lengthened diamine chain forming a main chain of a polyamic acid as shown in FIG. 12B is used.

Figure 12B:
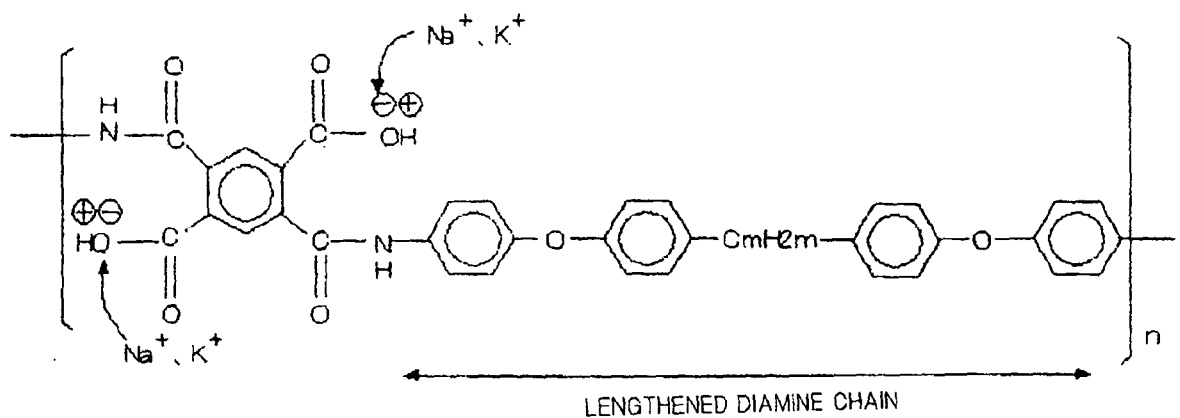
FIG. 12B is a diagram showing an exemplary molecular structure of a polyamic acid having a lengthened diamine chain forming a main chain.

Because the diamine chain that forms the main chain of the polyamic acid shown in FIG. 12B becomes longer, i.e., m=3 or more, as compared with the polyamic acid shown in FIG. 12A, polyimide molecules tend to become more nondense. For this reason, each alignment film allows an uncured component of the sealing material that has a certain molecular weight to easily penetrate into the alignment film, to say nothing of Na and K, thus resulting in an increased amount of adsorption. Such a diamine chain can be lengthened by increasing the number of benzene rings in the diamine chain of the polyamic acid. The diamine chain that forms the main chain of the polyamic acid used for the alignment films in the region outside the display region according to the present invention preferably has a value m of not less than 3. More preferably, the value m is from 3 to 9 in view of the adhesion of the alignment film to the underlying substrate.

It is also possible to increase the content of the polyamic acid in each alignment film formed in the region outside the display region by lowering the imidization rate of the alignment film, thereby further increasing the amount of ion adsorption. According to the present invention, the imidization rate of each alignment film in the display region ranges from 70% to 95% depending on the kind of the alignment material used. The imidization rate of each alignment film in the region outside the display region is preferably lower than that of the alignment film in the display region, particularly preferably not more than 70%.

Description will be made of a liquid crystal panel having the above-described feature which was fabricated as one exemplary embodiment and subjected to a reliability test.

Figure 13:
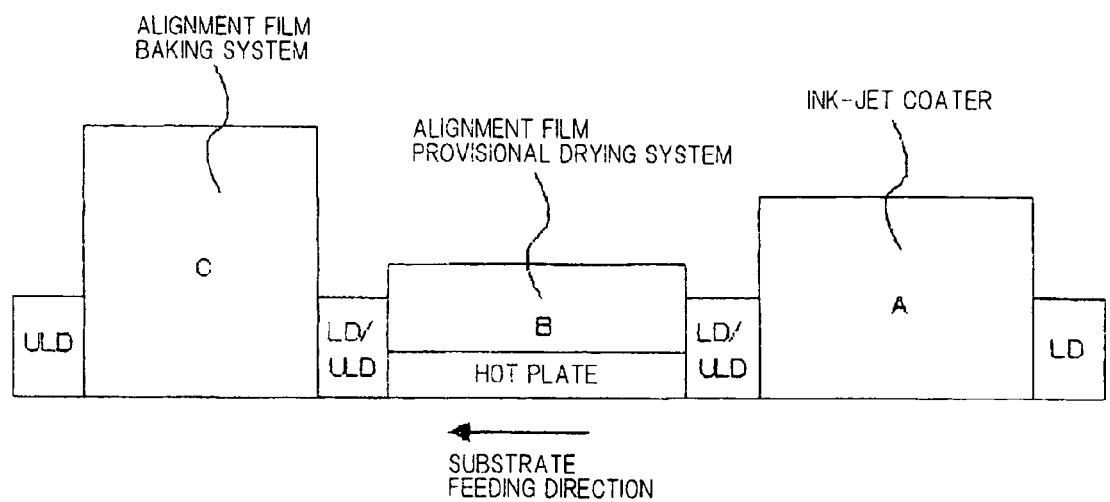
FIG. 13 is a schematic view illustrating a process from an alignment film application step to an alignment film baking step according to a sixth exemplary embodiment of the present invention.

FIG. 13 is a schematic view illustrating a process from the alignment film application step to the alignment film baking step for fabricating the liquid crystal panel according to the present invention.

In the alignment film application step, an ink-jet coater was used to apply the alignment material to surfaces of the TFT substrate and CF substrate, thus providing the display region and the region outside the display region with alignment films (step A in FIG. 13), in the same manner as in the fifth exemplary embodiment.

In this case, the alignment material shown in FIG. 12A was set in a syringe of a head for jetting the alignment material to the alignment application region inside the display region. Also, the alignment material shown in FIG. 12B (diamine chain: m=3) was set in a syringe of a head for jetting the alignment material to the alignment application region outside the display region. This arrangement was adapted to provide the region outside the display region with the alignment film which was more nondense than the alignment film in the display region. Needless to say, the impurity adsorption efficiency can be further improved by making the alignment film thickness larger in the region outside the display region than in the display region.

In the subsequent alignment film provisional drying step, leveling was performed at 80° C. for both the display region and the region outside the display region (step B in FIG. 13).

In the subsequent alignment film baking step, main baking was performed at 230° C. to provide required alignment films (step C in FIG. 13).

Thereafter, in the rubbing step, rubbing was performed on the alignment film surfaces of the TFT substrate and CF substrate by means of a rubbing roll made of rayon.

Subsequently, in the rubbing washing and drying step, the alignment film surfaces and the reverse sides of the TFT substrate and CF substrate were subjected to chemical cleaning and pure water cleaning and then to IR drying at 185° C.

Subsequently, in the seal application step, the sealing material was applied to predetermined positions on the TFT substrate so as to provide a peripheral (auxiliary) seal and a main seal each describing a shape of a closed loop. (In fabricating a TN mode liquid crystal display panel, the sealing material is mixed with Au balls serving as conductors.)

Subsequently, in the liquid crystal dispensing step, a predetermined amount of the liquid crystal material was dispensed dropwise in a matrix fashion (i.e., in a manner to form multiple dots in a matrix) in a region inside the main seal.

Thereafter, in the panel alignment step, the TFT substrate and the CF substrate were brought into contact with each other and then compressed to diffuse the liquid crystal material uniformly throughout a pixel region and a peripheral region between the substrates and to define a uniform gap between the substrates using columns.

Subsequently, before feeding the panel to the UV curing step, the sealing material was provisionally fixed by partially subjecting the peripheral seal to provisional UV curing at several points, in order to prevent the aligned substrates from being displaced from their fitted state.

In the subsequent UV curing step, the sealing material was cured by irradiation with ultraviolet rays of 3,000 mJ. Further, in the thermal curing step, the sealing material was completely cured by heating at 120° C. Then, the manufacturing of a liquid crystal display panel is completed by bonding polarizing plates to the backside of the TFT substrate and the CF substrate.

Thereafter, the liquid crystal display panel thus fabricated was subjected to the ACF attaching/TCP bonding step and the substrate bonding step and then fitted with a backlight source in the assembling step, to complete the manufacture of a liquid crystal display device.

The liquid crystal display device according to the present exemplary embodiment was subjected to a reliability test. An operation test in an environment having a temperature of 60° C. and a humidity of 60% was conducted on three liquid crystal display devices according to the present exemplary embodiment and on three comparative liquid crystal display devices related to the present invention. As a result, the liquid crystal display devices related to the present invention each gave rise to display unevenness, spot stain and the like in a peripheral portion of the panel within 500 hours from the start of the test, whereas any one of the liquid crystal display devices according to the present exemplary embodiment did not give rise to stain or display unevenness. Further, neither stain nor display unevenness was observed in any one of the liquid crystal display devices according to the present exemplary embodiment even after a lapse of 1,000 hours from the starting of the test.

The foregoing description has been directed to the cases where porous alignment films 7 are formed on both of TFT substrate 2 and CF substrate 3. However, even when porous alignment film 7 is formed on only one of TFT substrate 2 and CF substrate 3, it is possible to suppress the occurrence of visible defects caused by residual impurity ions and uncured components of sealing material 4.

While preferred embodiments of the present invention have been described using specific terms, such description is for illustrative purposes only, and it is to be understood that changes and variations may be made without departing from the spirit or scope of the following claims.

What is claimed is:

1. A liquid crystal display device comprising:
a pair of substrates;
an alignment film formed on each of opposed faces of said pair of substrates;
a sealing material formed outside of a display region of at least one of said substrates; and
a liquid crystal material encapsulated between said pair of substrates, wherein:
said alignment film comprises a first alignment film formed so as to cover at least said display region, and a second alignment film formed in a region lying outwardly of said first alignment film and inwardly of said sealing material;
said second alignment film has a higher ionic impurity adsorptive property than said first alignment film; and
said second alignment film has a porous film structure.

2. The liquid crystal display device according to claim 1, wherein said second alignment film has a larger film thickness than said first alignment film.

3. A liquid crystal display device, comprising:
a pair of substrates;
an alignment film formed on each of opposed faces of said pair of substrates;
a sealing material formed outside of a display region of at least one of said substrates; and
a liquid crystal material encapsulated between said pair of substrates, wherein:
said alignment film comprises a first alignment film formed so as to cover at least said display reton. and a second alignment film formed in a region lying outwardly of said first alignment film and inwardly of said sealing material;
said second alignment film has a higher ionic impurity adsorptive property than said first alignment film; and
a diamine chain forming a main chain contained in said second alignment film is longer than a diamine chain forming a main chain contained in said first alignment film.

4. A liquid crystal display device, comprising:
a pair of substrates;
an alignment film formed on each of opposed faces of said pair of substrates;
a sealing material formed outside of a display region of at least one of said substrates; and
a liquid crystal material encapsulated between said pair of substrates, wherein:
said alignment film comprises a first alignment film formed so as to cover at least said display region, and a second alignment film formed in a region lying outwardly of said first alignment film and inwardly of said sealing material;
said second alignment film has a higher ionic impurity adsorptive property than said first alignment film; and
an imidization rate of said second alignment film is lower than that of said first alignment film.

* * * * *